Figure 1:
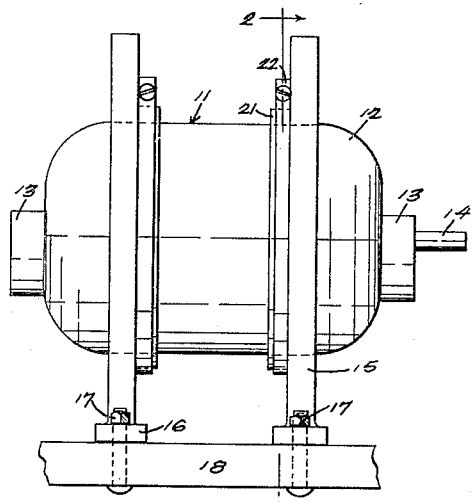

Sept. 10, 1929.                C. C. SPREEN                1,727,945
                            MACHINERY SUPPORT
                           Filed Dec. 30, 1926

Charles C. Spreen
Inventor
by Smith and Freeman
Attorneys

Patented Sept. 10, 1929.

1,727,945

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

MACHINERY SUPPORT.

Application filed December 30, 1926. Serial No. 157,949.

Figure 2:
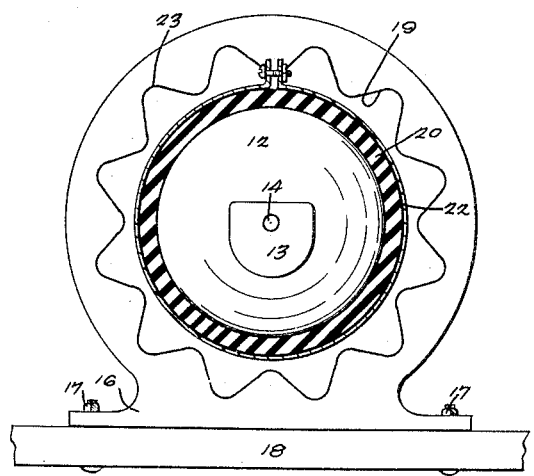

My invention relates to vibration reducing supports for machinery, and particularly to means for supporting the compressor operating motor of a domestic mechanical refrigeration unit to decrease the vibration of such motor, and the noise produced by such vibration, and the principal object of my invention is to provide new and improved means of this type. In the drawings accompanying this specification and forming a part of this application I have shown, for purpose of illustration, one form which my invention may assume, and in these drawings:

Figure 1 is an end elevation showing the embodiment of my invention herein disclosed, while Figure 2 is a section on the line 2—2 of Figure 1 with the motor in elevation.

The embodiment of my invention is disclosed herein as applied to an electric motor 11 having a frame 12 terminating in hubs 13 rotatably supporting a motor shaft 14, and as comprising, on each longitudinal half of the motor 11: supported means herein shown as consisting of the motor frame 12; supporting means herein shown as consisting of a bracket 15 consisting of a base 16 adapted to be secured by means of bolts 17 to a suitable support 18 and provided with an irregular aperture 19 adapted to loosely receive the motor frame 12; and intermediate means only resiliently connecting the supported means to the supporting means herein shown as an annular member 20 formed of soft rubber, provided with a laterally extending flange 21, secured to the motor frame 12 by means of a band 22 encircling the flange 21 to clamp the flange 21 firmly to the frame 12, and provided also with a skirt 23 having its outer periphery formed complementary to the irregular surface of the aperture 19 in the bracket 15.

From the above description it will be obvious to those skilled in the art that the motor 11 may be assembled in position merely by assembling the members 20 upon the motor frame 12, inserting the assembled unit within the brackets 15, and then adding the clamping rings 22 to clamp the members 20 firmly to the motor frame 12 and at the same time prevent longitudinal displacement of the assembled unit from the brackets 15 by engagement of the ears of the clamp rings 22 with the inner faces of the brackets 15; that at the completion of such assembling the motor 11 will be supported held only resiliently through the members 20 against both rotary and translatory movements; that both rotary and translatory vibration of the motor 11 will thus be practically eliminated, even with alternating current; and that the noise from such vibration will be similarly practically eliminated.

Under these circumstances it will be obvious to those skilled in the art that the embodiment of my invention herein shown and described accomplishes at least the principal object of my invention.

At the same time it will also be obvious to those skilled in the art that the embodiment of my invention herein shown and described may be variously changed and modified without departing from the spirit of my invention, or sacrificing the advantages thereof, and therefore it will be understood that the disclosure herein is illustrative only, and that my invention is not limited thereto.

I claim:

1. A vibration reducing support for an electric motor comprising a base, vertical brackets each having a corrugated aperture, said brackets being detachably attached to said base, a soft rubber member provided with a flange fitting into each of said apertures, and a band for clamping said flange to the frame of said motor, said motor being entirely supported by said rubber members and said brackets.

2. A vibration reducing support for an electric motor comprising a base, vertical brackets each provided with an aperture, said brackets being detachably secured to said base, resilient annular members each having a central aperture adapted to receive said motor intermediate of the ends, said resilient members having a flange about said aperture, and a flexible band for securing said motor to said flange on said resilient members.

In testimony whereof I hereunto affix my signature.

CHARLES C. SPREEN.